(12) United States Patent
Heer et al.

(10) Patent No.: US 11,876,414 B2
(45) Date of Patent: Jan. 16, 2024

(54) ELECTRIC MOTOR COMPRISING A WIRING UNIT, AND METHOD FOR PRODUCING AN ELECTRIC MOTOR COMPRISING A WIRING UNIT

(71) Applicant: SEW-EURODRIVE GMBH & CO. KG, Bruchsal (DE)

(72) Inventors: Markus Heer, Maulburg (DE); Domenik Hettel, Au am Rhein (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 620 days.

(21) Appl. No.: 17/261,305

(22) PCT Filed: Jul. 4, 2019

(86) PCT No.: PCT/EP2019/025215
§ 371 (c)(1),
(2) Date: Jan. 19, 2021

(87) PCT Pub. No.: WO2020/015857
PCT Pub. Date: Jan. 23, 2020

(65) Prior Publication Data
US 2021/0281152 A1    Sep. 9, 2021

(30) Foreign Application Priority Data
Jul. 19, 2018   (DE) .......................... 102018005673.3

(51) Int. Cl.
*H02K 3/52*      (2006.01)
*H02K 15/095*    (2006.01)
(Continued)

(52) U.S. Cl.
CPC ............. *H02K 19/12* (2013.01); *H02K 3/522* (2013.01); *H02K 15/095* (2013.01); *H02K 5/225* (2013.01); *H02K 2203/09* (2013.01)

(58) Field of Classification Search
CPC ....... H02K 3/522; H02K 5/225; H02K 15/095
See application file for complete search history.

(56) References Cited

U.S. PATENT DOCUMENTS

| 9,601,958 B2 | 3/2017 | Yamaguchi et al. |
| 10,686,344 B2 | 6/2020 | Csoti et al. |

(Continued)

FOREIGN PATENT DOCUMENTS

| DE | 10328720 A1 | 1/2005 |
| DE | 102012020329 A1 | 4/2014 |

(Continued)

OTHER PUBLICATIONS

International Search Report issued in corresponding International Application No. PCT/EP2019/025215, dated Sep. 26, 2019, pp. 1-3, English Translation.

*Primary Examiner* — Gary A Nash
(74) *Attorney, Agent, or Firm* — CARTER, DELUCA & FARRELL LLP

(57) ABSTRACT

An electric motor includes a rotor and a stator, the stator having multiple coils, each coil having two coil connections, the stator in particular having multiple stator segments, and each stator segment having precisely one coil, the coils being connected to one another with the aid of a wiring unit, the wiring unit having a carrier part for accommodating multiple wiring elements set apart from one another.

24 Claims, 11 Drawing Sheets

(51) Int. Cl.
*H02K 5/22* (2006.01)
*H02K 19/12* (2006.01)

(56) References Cited

U.S. PATENT DOCUMENTS

| | | | | |
|---|---|---|---|---|
| 2006/0091745 A1* | 5/2006 | Klappenbach | ......... | H02K 3/522 |
| | | | | 310/71 |
| 2012/0319512 A1 | 12/2012 | Nakagawa | | |
| 2016/0020660 A1 | 1/2016 | Houzumi | | |
| 2016/0111929 A1* | 4/2016 | Kessler | ................ | H02K 3/522 |
| | | | | 310/71 |

FOREIGN PATENT DOCUMENTS

| | | | | |
|---|---|---|---|---|
| DE | 102012024581 A1 | 6/2014 | | |
| DE | 102014201637 A1 | 7/2015 | | |
| DE | 112013005061 T5 | 7/2015 | | |
| DE | 102015200093 A1 | 7/2016 | | |
| DE | 102016204935 A1 | 9/2017 | | |
| EP | 2139098 A2 * | 12/2009 | ......... | H02K 15/0062 |
| EP | 2139098 A2 | 12/2009 | | |
| EP | 2752973 A1 | 7/2014 | | |
| JP | 2015080382 A | 4/2015 | | |
| JP | 5954423 B2 | 7/2016 | | |
| WO | 2015151214 A1 | 10/2015 | | |
| WO | WO-2015151214 A1 * | 10/2015 | ............. | H02K 3/522 |

\* cited by examiner

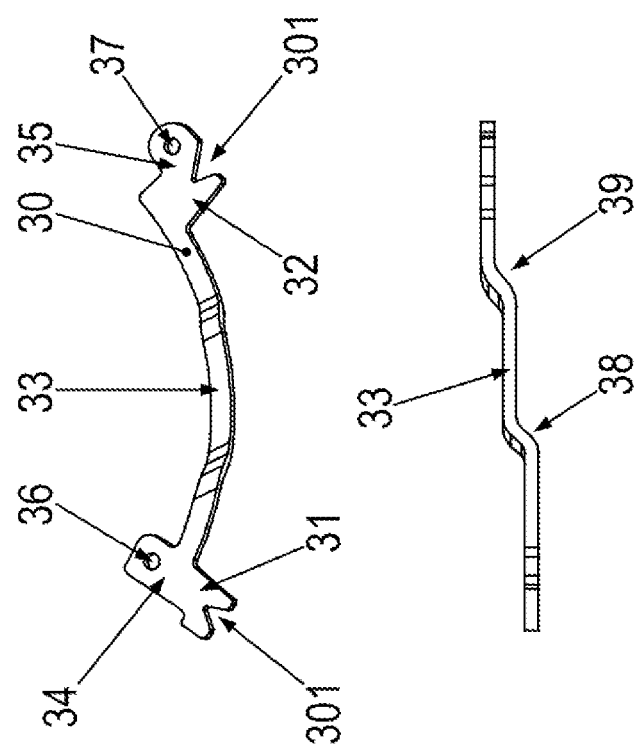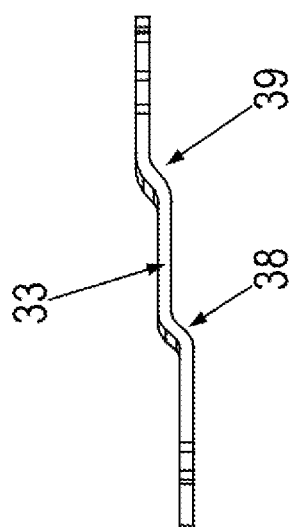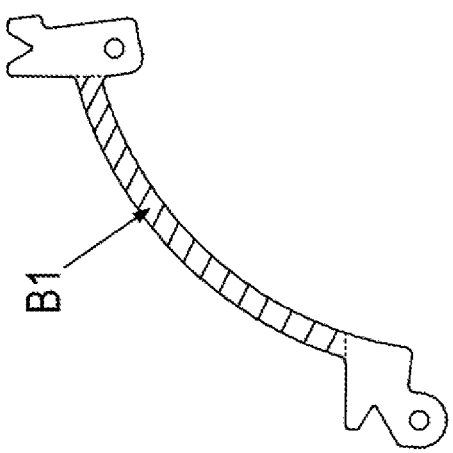

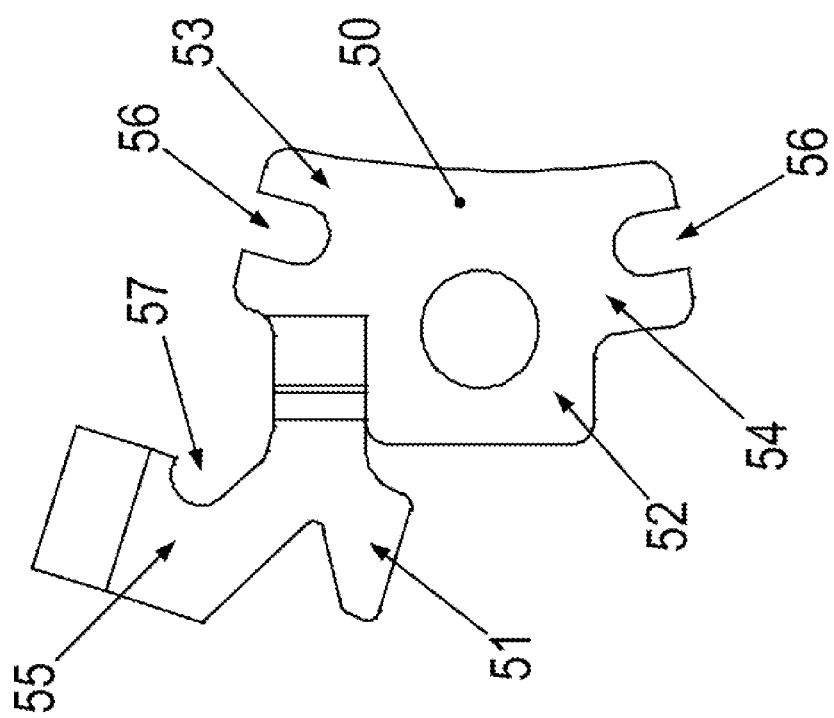
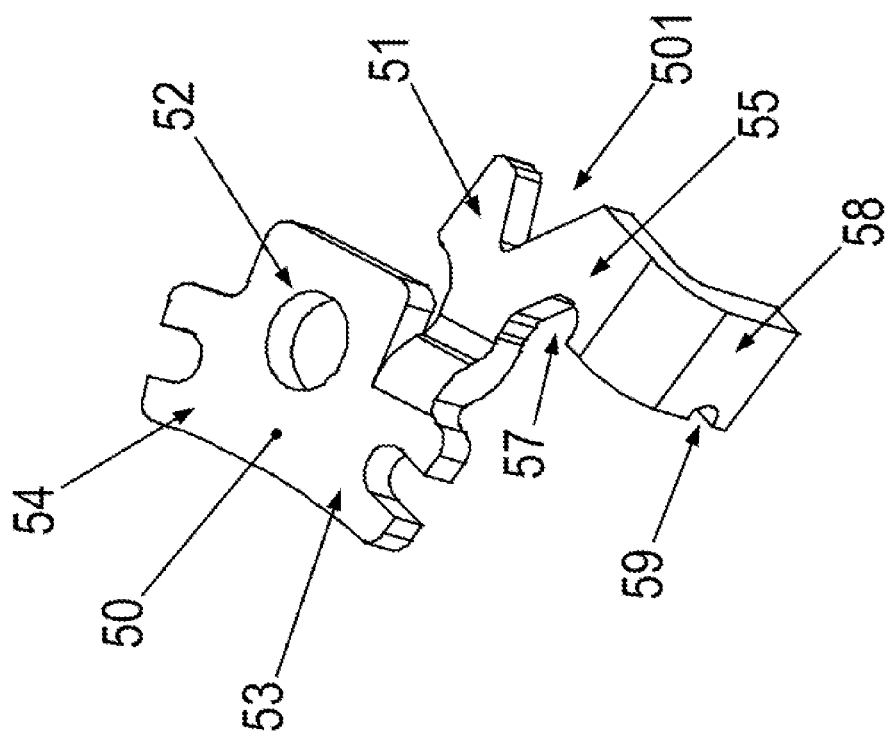
Fig. 5B
Fig. 5A

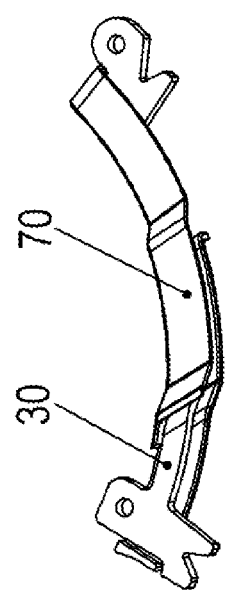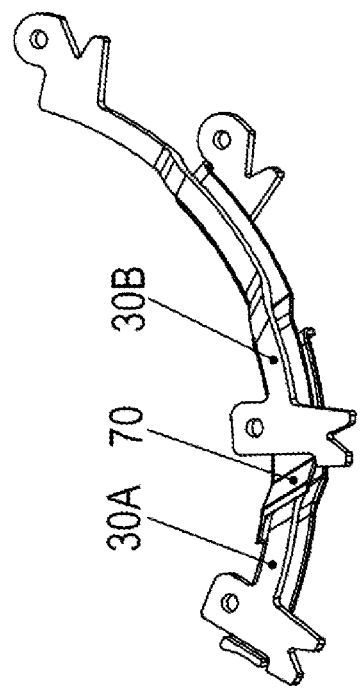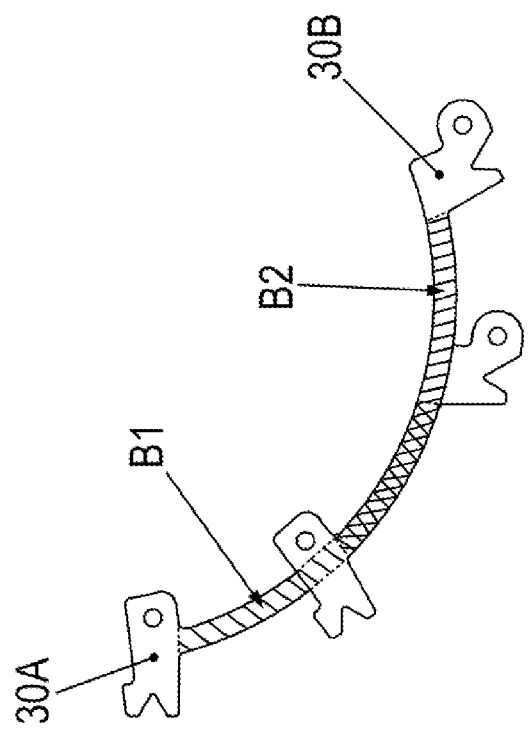

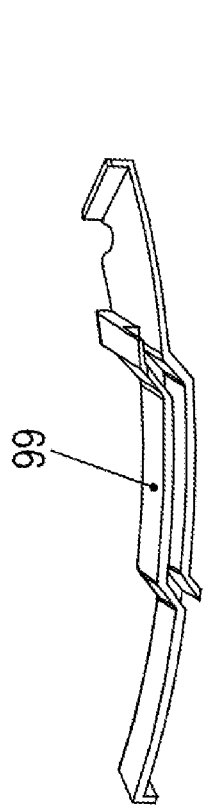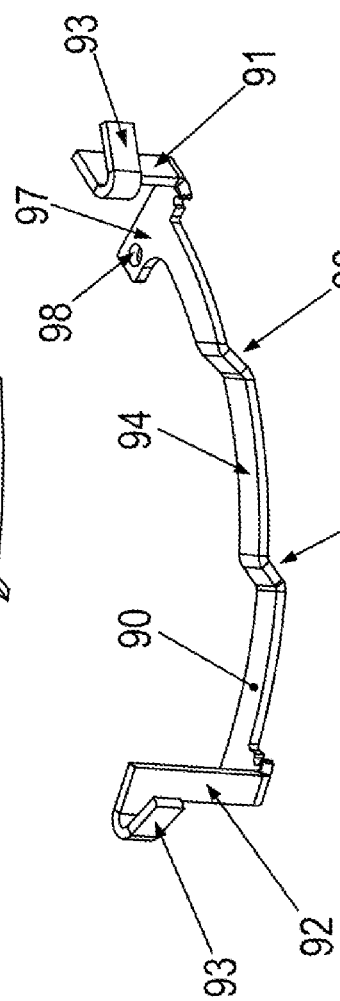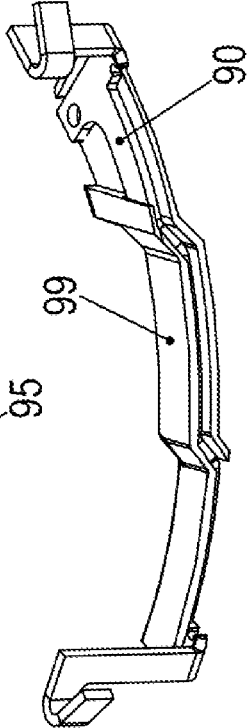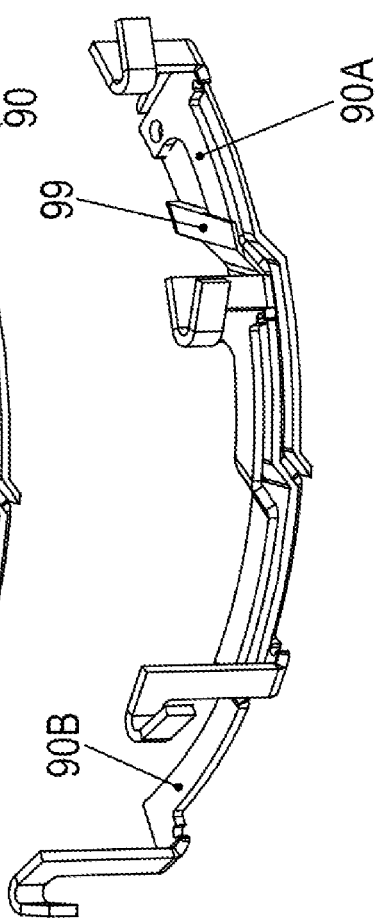
Fig. 9A
Fig. 9B
Fig. 9C
Fig. 9D

ELECTRIC MOTOR COMPRISING A WIRING UNIT, AND METHOD FOR PRODUCING AN ELECTRIC MOTOR COMPRISING A WIRING UNIT

FIELD OF THE INVENTION

The present invention relates to an electric motor having a wiring unit, and to a method for its production.

BACKGROUND INFORMATION

Certain conventional electric motors have a stator on which a multiphase winding is situated. The winding is made up of multiple interconnected coils, for instance. In addition, certain stators made up of wrapped individual teeth are conventional, in which each stator tooth thus accommodates an individual tooth winding. Each individual tooth winding forms a coil, which is produced from winding wire. The free ends of a winding wire form the two coil connections of a coil, which normally have to be connected to one another at one or at both axial ends of the stator in order to form the multiphase winding. A star connection and a delta connection may be provided in this context.

Example embodiments of the present invention are especially suitable for synchronous motors whose stators are made up of individual stator tooth segments, each stator tooth segment having a coil, i.e., a single-tooth winding. These synchronous motors in particular have a three-phase winding with the phases U, V and W, and a coil group is, for example, allocated to each phase. A coil group in turn includes multiple individual coils, which are electrically connected to one another with the aid of the wiring unit as described herein. Thus, a coil connection of a coil is contacted by another coil connection of another coil with the aid of a wiring element of the wiring unit. The coil groups connected in this manner are, for example, interconnected in a star connection.

Different wiring types for coil connections are conventional.

German Patent Document No. 11 2013 005 061 describes a stator unit and a motor in which a bus-bar unit is situated on a topside of the stator.

German Patent Document No. 10 2012 024 581 describes an electric motor having a wiring ring in which wire sections are inserted into concentrically extending grooves, which are radially set apart.

German Patent Document No. 10 2012 020 329 describes an electric motor having a wiring ring in which electrical lines, in particular, arranged as punched and bent parts, are inserted into concentrically extending grooves, which are radially set apart.

German Patent Document No. 103 28 720 describes an electric machine, which has an annular carrier and circuit traces situated in the carrier for the electrical connection of coils and winding strands. The circuit traces are inserted into the carrier on edge, radially stacked one behind the other and at an offset from one another in the circumferential direction.

German Patent Document No. 10 2014 201 637 describes an electric motor having a carrier component in which the wiring of the winding ends is implemented with the aid of multi-part bus bars.

European Patent Document No. 2 752 973 describes an electric motor having a wiring ring in which bus bars in the form of circular arcs are inserted into two annular grooves of the wiring ring.

German Patent Document No. 10 2016 204 935 describes an electric machine having a wiring plate in which circuit elements are used for connecting the windings to one another, the circuit elements being plastic-extrusion-coated in order to provide insulation.

German Patent Document No. 10 2015 200 093 describes a wiring plate of a stator of an electric machine, the wiring plate having circuit elements which can be connected to the electrical winding.

SUMMARY

Example embodiments of the present invention provide an electric motor having a wiring unit, and a method for its production, in which the production outlay in the production is reduced and the electric motor is able to be manufactured in a simpler, more cost-effective and stable manner.

According to an example embodiment of the present invention, an electric motor, in particular a permanently excited synchronous motor, includes a rotor situated so as to be rotatable about an axis of rotation and a stator. The the stator has multiple coils, each coil having two coil connections, the stator in particular having multiple stator segments and each stator segment having precisely one coil, the coils being connected to one another with the aid of a wiring unit, in particular in a star connection, the wiring unit having a carrier part, in particular a substantially annular carrier part, in particular a carrier part made from an insulating material, for the accommodation of multiple, in particular at least four, wiring elements which are set apart from one another, the wiring unit in particular being situated at an axial end of the stator, in particular concentrically with the axis of rotation, at least three first wiring elements being provided, in particular, each of the first wiring elements having two, in particular precisely two, contacting regions which are set apart from one another, and a connection region connected to the contacting regions, in particular so that the connection region is situated between the contacting regions, the contacting regions, in particular all contacting regions, of each first wiring element being connected to one of the coil connections at a connection point in each case, in particular electrically connected, in particular integrally connected with the aid of laser welding, the region covered by the connection region of one of the first wiring elements in the circumferential and the radial direction overlapping with a region covered by the connection region of another of the first wiring elements in the circumferential and the radial direction in each case.

The terms "circumferential direction", "radial direction" and "axial direction" refer to directions relative to the axis of rotation of the rotor. The axial direction thus denotes the direction parallel to the axis of rotation while the radial direction denotes the directions orthogonal to the axis of rotation and from the axis of rotation radially outward or radially inward toward the axis of rotation. The circumferential direction is to be understood as the direction that extends along the circumference of a closed curve, in particular a circle, extending perpendicular and in particular concentrically to the axis of rotation. The term is therefore not restricted to circular circumferences but may also be used for elliptical or polygonal circumferences, for example.

The term "essentially annular carrier part" is to denote that the carrier part has a disk-shaped design, i.e., has an uninterrupted opening in the center, and the extension in the axial direction is smaller than the diameter of the carrier part in the plane orthogonal to the axis of rotation. The precise form of the outer and inner contour is not necessarily circular as in a ring. Other forms such as polygonal forms are also possible. It is also possible that the form deviates from the ideal circular form in that, for example, recesses are provided at the outer circumference or at the inner circumference.

Plastic is, for example, used as insulating material for the carrier part. More specifically, the carrier part is produced by a plastic injection molding method. However, other materials featuring electrical insulation properties, i.e., insulating materials, may be used as well.

The carrier part accommodates the wiring elements and thus provides for the physical positioning of the wiring elements relative to one another. The wiring elements are set apart from one another, i.e., they do not touch and are therefore also not in direct contact with one another.

Instead of laser welding, brazing, ultrasonic welding or resistance welding may also be performed.

The wiring elements are made from an electrically conductive material, e.g., from metal or sheet metal, and in particular from copper sheet metal. The wiring elements are, for example, arranged as one piece and/or as punched and bent parts. The production may be carried out using water-jet cutting or laser cutting.

A "connection point" is understood as the particular location where an electrical connection exists between a wiring element and a coil connection.

A "region" means a certain part of a component, which carries out a particular function. For example, the connection region of the first wiring element connects the two contacting regions. The contacting regions in turn are used for contacting the wiring elements to the coil connections.

If a component is arranged as one piece, an exact boundary between the regions is not always precisely definable. The region of a component should not be confused with a "region" of a component "covered" in one direction.

Each first wiring element accommodated on the carrier part is situated above or below at least one other first wiring element in the axial direction. Thus, the first wiring elements are partially stacked on top of one another in an axial direction but without touching one another. The region of a connection region covered in the circumferential and radial direction is the particular surface that is produced by a projection of the corresponding connection region parallel to the axial direction onto a projection plane orthogonal to the axis of rotation. The projection surfaces of the connection regions of two first wiring elements produced in this manner thus overlap in the projection plane. This offers the advantage that a compact configuration of the wiring unit is achievable.

According to example embodiments of the present invention, each of the first wiring elements has a first fastening region for the positive and/or integral connection to the carrier part. This has the advantage that a secure and stable, in particular an irreversible, connection of the wiring elements to the carrier parts is achievable, so that a protection against loss is provided.

According to example embodiments, each of the first fastening regions has an uninterrupted first recess in the axial direction, and the carrier part has multiple rivet pins extending in the axial direction, and a first rivet pin is able to be guided through each of the first recesses, the free ends of the first rivet pins being reshaped into rivet heads, in particular with the aid of ultrasonic welding. As an alternative to ultrasonic welding, heat staking or hot stamping is also able to be implemented.

For example, the recess may be arranged as a cylindrical hole, in particular. A hole is an example of a closed recess. Also possible, however, are open recesses which do not form a closed curve in the plane orthogonal to the axis of rotation. For instance, a notch in the axial direction likewise constitutes a recess. Significant is merely that the recess is uninterrupted in the axial direction and is suitable for contributing to a positive and/or integral connection to the carrier part.

A rivet pin describes an extension in an axial direction, which is shaped such that it is able to be guided through the recesses of the first wiring elements in the axial direction. In the exemplary case of a cylindrical hole as a recess, the rivet pin is arranged as a cylindrical extension in the axial direction. The positive and/or integral connection is produced by the reshaping of the free end of the rivet pin into a rivet head. To achieve a positive connection, mushroom-shaped rivet heads or disk-shaped rivet heads, for example, are suitable. The diameter of the rivet head in the plane orthogonal to the axis of rotation is selected to be larger than the diameter of the respective recess in the same plane.

According to example embodiments, each of the first wiring elements has a second fastening region for the positive and/or integral connection to the carrier part, each of the second fastening regions in particular having a second uninterrupted recess in the axial direction, and a second rivet pin is able to be guided through each of the second recesses, the free ends of the second rivet pins being reshaped into rivet heads, in particular by ultrasonic welding.

This offers the advantage that a better and more stable spatial affixation of the first wiring elements on the carrier part is achievable, so that a movement of the wiring elements relative to the carrier element is prevented.

According to example embodiments, the first fastening regions of each of the first wiring elements have the same first radial position and/or the same first axial position in each case, and/or the second fastening regions of each of the first wiring elements have the same second radial position and/or the same second axial position in each case, the first radial position and the second radial position differing, in particular, and the first axial position and the second axial position differing, in particular. This has the advantage of further improving the spatial affixation of the first wiring elements on the carrier part. Tilting of the wiring elements relative to the carrier part is prevented.

According to example embodiments, the carrier part has a plurality of guide regions on its outer circumference for guiding the coil connections in the axial direction, a guide region being allocated to each contacting region connected to a coil connection, and the form of the guide region in particular being substantially similar to the form of the respectively allocated contacting region. This has the advantage that the step of contacting the coil connections to the wiring unit in the method for producing the electric motor is able to be carried out in a more reliable manner. The guidance of the coil connections ensures that the coil connections are substantially aligned in parallel with the axis of rotation. The coil connections may be clamped to the guide regions and thereby facilitate the method step of producing an integral connection between the contacting region and the coil connection. This makes it possible to achieve an automated production.

According to example embodiments, a second wiring element is provided, which has three, in particular precisely three, contacting regions, each of the three contacting regions of the second wiring element being connected to one of the coil connections, in particular electrically connected, in particular in an integral fashion by laser welding, in particular. This has the advantage that wiring of the coils in a star connection is possible. The second wiring element is used as a star point element for the connection of three different coil connections. For wiring in a delta connection, the second wiring element may be omitted.

According to example embodiments, the second wiring element has two, in particular precisely two, fastening regions for the positive and/or integral connection to the carrier part, each fastening region in particular having an uninterrupted recess in the axial direction, and a third rivet pin is able to be guided through each of the recesses, the free ends of the third rivet pins in particular being reshaped into rivet heads, in particular with the aid of ultrasonic welding. This has the advantage that a better and more stable spatial affixation of the second wiring element on the carrier part is achievable so that a movement of the wiring element relative to the carrier part is prevented.

According to example embodiments, multiple third wiring elements, in particular precisely three, are provided, which have a first contacting region and a second contacting region in each case, which particularly have a different development, the first contacting region of a third wiring element being connected to one of the coil connections, in particular electrically connected, in particular in an integral fashion by laser welding. This offers the advantage of allowing for an uncomplicated connection of the in particular three phase conductors to the electric motor. The third wiring elements are electrically connected to the first contacting region, to the particular coils to be connected to a phase. The second contacting region then is suitable for connecting the third wiring elements to the phase conductors in order to thereby establish an electrical connection between the phase conductor and the coil. For example, the connection is obtained by fastening cable lugs of the phase conductors to the second fastening region using screws and nuts.

According to example embodiments, each third wiring element has a first and a second fastening region for the positive and/or integral connection to the carrier part, each of the two fastening regions in particular having an uninterrupted recess in the axial direction, and a fourth rivet pin is able to be guided through each of the recesses, the free ends of the fourth rivet pins in particular being reshaped into rivet heads, in particular by ultrasonic welding. This has the advantage that a better and more stable spatial affixation of the third wiring elements on the carrier part is achievable, so that a movement of the wiring elements relative to the carrier part is prevented.

According to example embodiments, each of the third wiring elements has a third fastening region for the positive and/or integral connection to the carrier part, the third fastening region abutting the first contacting region of the respective third wiring element, the third fastening region in particular having an uninterrupted recess in the axial direction through which a fifth rivet pin is able to be guided, the free ends of the fifth rivet pins in particular being reshaped into rivet heads, in particular by ultrasonic welding. This has the advantage of further improving the spatial affixation of the third wiring elements on the carrier part.

According to example embodiments, the contacting regions of each first wiring element are formed such that the respective connection points have substantially the same radial position, in particular at the outer circumference of the carrier part, and/or have the same axial position in each case. This has the advantage that the contacting of the contacting regions to the coil connections is easy to implement. An automated assembly is therefore possible.

The connection points are, for example, situated at the outer circumference of the carrier part, which means that easy accessibility is provided.

According to example embodiments, the regions covered by the connection regions of the first wiring elements in the axial direction are identical. This offers the advantage that space is able to be saved in the axial direction so that a compact configuration of the wiring unit in the axial direction is achievable.

According to example embodiments, the regions covered by the connection regions of the first wiring elements in the radial direction are identical. This offers the advantage that space is able to be saved in the radial direction so that a compact configuration of the wiring unit in the radial direction is achievable.

According to example embodiments, the connection region of each of the first wiring elements has a cross-section, in particular an approximately rectangular cross-section, whose extension in the axial direction is smaller than its extension in the radial direction. This is considered advantageous insofar as space is able to be saved in the axial direction.

According to example embodiments, at least one connection region of one of the first wiring elements has two axial steps, in particular all connection regions of the first wiring elements have two axial steps. This has the advantage that the partial stacking of the first wiring elements on top of one another is simplified. Instead of discrete steps in the connection region, a gradient of the connection region which particularly has a constant extension in the axial direction is an option as well, so that it is possible for the two contacting regions to have different axial positions, and partial stacking on top of one another is possible.

According to example embodiments, the region covered by one of the first wiring elements in the circumferential and radial direction overlaps with two regions covered by two of two other first wiring elements in the circumferential and radial directions. This is considered advantageous insofar as a more compact configuration of the wiring unit is achievable. The wording should be understood to express that three first wiring elements are axially positioned on top of one another in certain circumferential and radial regions.

According to example embodiments, the region covered by the second wiring element in the radial direction and the region covered by at least one of the first wiring elements, in particular the region covered by all first wiring elements in the radial direction, are identical. This has the advantage that space can be saved in the radial direction so that a compact configuration of the wiring unit in the radial direction is achievable.

According to example embodiments, the region covered by the second wiring element in the circumferential and radial direction and the region covered by at least one of the first wiring elements, in particular the region covered by two of the first wiring elements in the circumferential and radial direction, overlap. This has the advantage that a compact configuration of the wiring unit is achievable.

According to example embodiments, the first wiring elements have an identical configuration, and/or the third wiring elements have an identical configuration. This offers the advantage that fewer different wiring elements have to be produced, which reduces the production outlay. The wiring unit is able to be produced using a type of first wiring elements and/or a type of third wiring elements. This facilitates the in particular automated production of the first wiring elements, for instance when the elements are produced by machines as punched and bent parts.

According to example embodiments, at least one of the first wiring elements is surrounded by an insulation part made from an insulating material, in particular produced by an injection molding process, such that the surrounded first wiring element and the surrounding insulation part are positively connected on both sides in the circumferential direction, and/or are positively connected on both sides in the axial direction, and/or are positively connected on one side in the radial direction, in particular only every second of the first wiring elements being surrounded in this manner by a respective insulation part in the circumferential direction. This has the advantage that an adequate electrical insulation of the first wiring elements among one another is easily achievable. Using prefabricated insulation parts makes it possible to obtain smaller clearances between the first wiring elements while simultaneously ensuring corresponding creepage distances for an adequate electrical insulation. As an alternative, it would be possible to carry out retroactive extrusion-coating of the first wiring elements with an insulating material. However, this method is more difficult to execute and is more expensive.

According to example embodiments, the coil connections are integrally connected by laser welding to the contacting regions of the first and/or to the contacting regions of the second and/or to a contacting region of the third wiring elements in each case, the contacting regions to be connected having a V-shaped notch for the accommodation of a coil connection in the form of a winding wire, the V-shaped notch in particular having an arc section and the radius of the arc section in particular being at most as large as the radius of the winding wire.

This has the advantage that the contacting with the aid of laser welding is able to be carried out so rapidly that no significant heating of the first wiring elements occurs. This makes it possible for the welding spots to lie close to parts made from an insulating material, in particular plastic, without the heating damaging and/or deforming them. This particularly makes it possible to place a contacting region physically close, i.e., next to, a fastening region, which leads to a more compact configuration.

The V-shaped notch has the advantage that a secure and reliable electrical connection is always able to be produced for different diameters of winding wires. The wire always lies symmetrically to the axis of symmetry of the notch and therefore contacts the contacting region in at least two points. One type of contacting region is therefore able to be used for different wire diameters.

According to an example embodiment of the present invention, a method for producing an electric motor includes the following, in particular consecutive, steps: providing a carrier part, in particular a substantially annular, carrier part, made from an insulating material, the carrier part in particular being produced by an injection molding process; placing multiple first wiring elements on the carrier part in the circumferential direction, the first wiring elements having two, in particular precisely two, contacting regions in each case and the first wiring elements being placed such that the region covered by one of the first wiring elements in the circumferential and radial direction overlaps a region covered by an adjacent first wiring element in the circumferential and radial direction, the first wiring elements being set apart from one another; connecting the first wiring elements to the carrier part, in particular in a positive and/or integral manner, in order to form a wiring unit; connecting, in particular electrically connecting, in particular integrally connecting with the aid of laser welding, each of the contacting regions of the first wiring elements to a coil connection of one of a plurality of coils having two coil connections in each case, which are situated on a stator of the electric motor, in order to connect the coils into a multiphase winding.

This has the advantage that a compact configuration of the wiring unit is achievable.

According to example embodiments, each of the first wiring elements has a first fastening region for the positive and/or integral connection to the carrier part, each of the first fastening regions in particular having a first uninterrupted recess in the axial direction, and the carrier part having multiple rivet pins extending in the axial direction, and a first rivet pin is guided through each of the first recesses, the free ends of the first rivet pins in particular then being reshaped into rivet heads, in particular by ultrasonic welding. This has the advantage that a stable connection is able to be established between the first wiring elements and the carrier part.

According to example embodiments, the first wiring elements are placed such that only every second of the first wiring elements is surrounded in the circumferential direction by an insulation part made from an insulating material, in particular produced with the aid of an injection molding process, the surrounded first wiring element and the surrounding insulation part being positively connected on both sides in the circumferential direction and/or being positively connected on both sides in the axial direction, and/or being positively connected on one side in the radial direction.

This has the advantage that an adequate electrical insulation of the first wiring elements among one another is easy to achieve. The use of prefabricated insulation parts makes it possible to obtain smaller clearances between the first wiring elements while simultaneously ensuring corresponding creepage distances for an adequate electrical insulation. As an alternative, retroactive injection molding of the first wiring elements using an insulating material is possible. However, this method is more difficult to execute and is more expensive.

According to example embodiments, a second wiring element is placed on the carrier part, the second wiring element having three, in particular precisely three, contacting regions, in the process, the second wiring element is connected to the carrier part, in particular in a positive and/or integral fashion, in order to form the wiring unit, each contacting region of the second wiring elements is connected to one of the coil connections, in particular electrically connected, in particular connected in an integral fashion by laser welding.

This has the advantage that wiring of the coils in a star connection is possible. The second wiring element serves as a star point element for the connection of three different coil connections.

According to example embodiments, three third wiring elements are placed on the carrier part, the third wiring elements having two contacting regions in each case, in particular of a different type, and the third wiring elements are connected to the carrier part, in particular in a positive and/or integral fashion, in order to form the wiring unit, and one of the two contacting regions of the third wiring elements is connected to one of the coil connections in each case, in particular electrically connected, in particular connected in an integral fashion with the aid of laser welding.

This has the advantage that it allows for an uncomplicated connection of the in particular three phase conductors to the electric motor. The third wiring elements are connected by one of their contacting regions to the particular coils that are to be connected to a phase. The connection of these coils to the phase conductors is then easily obtained, e.g., with the aid of cable lugs.

According to example embodiments, the stator with the coils as well as the wiring unit connected to the coil connections are encapsulated by casting compound, in particular such that the contacting regions of the third wiring elements that are not connected to a coil connection remain free of casting compound.

This offers the advantage that a stable mechanical affixation of the wiring unit on the stator is able to be obtained.

Further features and aspects of example embodiments of the present invention are described in greater detail below with reference to the appended Figures

BRIEF DESCRIPTION OF THE DRAWINGS

FIG. 3A is a perspective view of a first wiring element of the first example embodiment of the wiring unit.

FIG. 3B is a side view of the first wiring element of FIG. 3A.

FIG. 3C illustrates a projection in the axial direction onto a plane, orthogonal to an axis of rotation, of the first wiring element of FIGS. 3A and 3B.

FIG. 5A is a perspective view of a third wiring element of the first example embodiment of the wiring unit.

FIG. 5B is a top view of the third wiring element of FIG. 5A.

FIG. 7A is a perspective view of the first wiring element of FIG. 3A with an insulation part slipped thereon.

FIG. 7B is a perspective view of two first wiring elements.

FIG. 7C illustrates a projection in an axial direction onto a plane, orthogonal to the axis of rotation, of the two first wiring elements of FIG. 7B.

FIG. 9A is a perspective view of an insulation part of a second example embodiment of the wiring unit.

FIG. 9B is a perspective view of a first wiring element of the second example embodiment of the wiring unit.

FIG. 9C is a perspective view of the insulation part of FIG. 9A together with the first wiring element of FIG. 9B.

FIG. 9D is a perspective view of the insulation part and the first wiring element of FIG. 9C and a further first wiring element.

DETAILED DESCRIPTION

Figure 1:
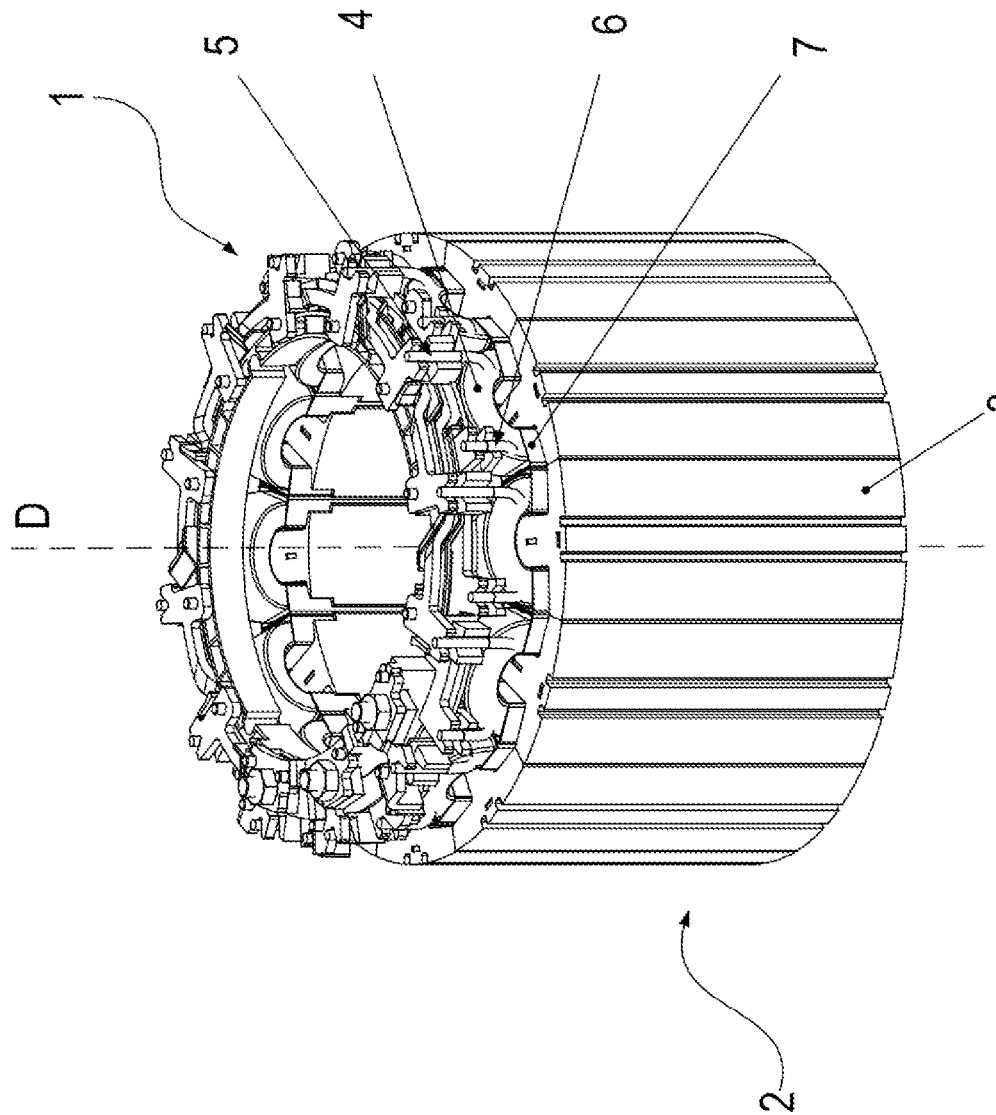
FIG. 1 is a perspective view of a first example embodiment of a wiring unit situated on a stator of an electric motor.

In the following text, exemplary embodiments of the present invention are described based on the appended drawings, and the same reference numerals are used for parts acting in a similar manner and will not be described again for every figure.

FIG. 1 shows in a perspective representation a first example embodiment of a wiring unit 1, which is situated at an axial end of a stator 2 of an electric motor according to an example embodiment of the present invention. Stator 2 of the electric motor is made up of individual stator segments 3. In the illustrated exemplary embodiment, stator 2 has twelve stator segments 3. The number 12 is only of an exemplary nature since different numbers of stator segments are also possible. In this exemplary embodiment, stator segments 3 are, for example, arranged as package-punched laminated cores.

Stator segments 3 are connected to one another such that they form a substantially cylindrical stator 2. Situated in the interior of stator 3 is a rotor, which is mounted so as to be rotatable about an axis of rotation D. Rotor and stator 2 are situated concentrically with respect to axis of rotation D. The rotor has, for example, permanent magnets, and the electric motor is, for example, implemented as a permanently excited synchronous motor.

Each stator segment 3 has a stator tooth around which a coil 4 is wrapped. The coil is made of insulated winding wire. The two ends of the winding wire are stripped and form the two coil connections 5, 6. Coils 4 are shown only schematically in FIG. 1. Insulation paper 7 is situated between coils 4 and stator segments 3 for the electrical insulation.

Figure 2A:
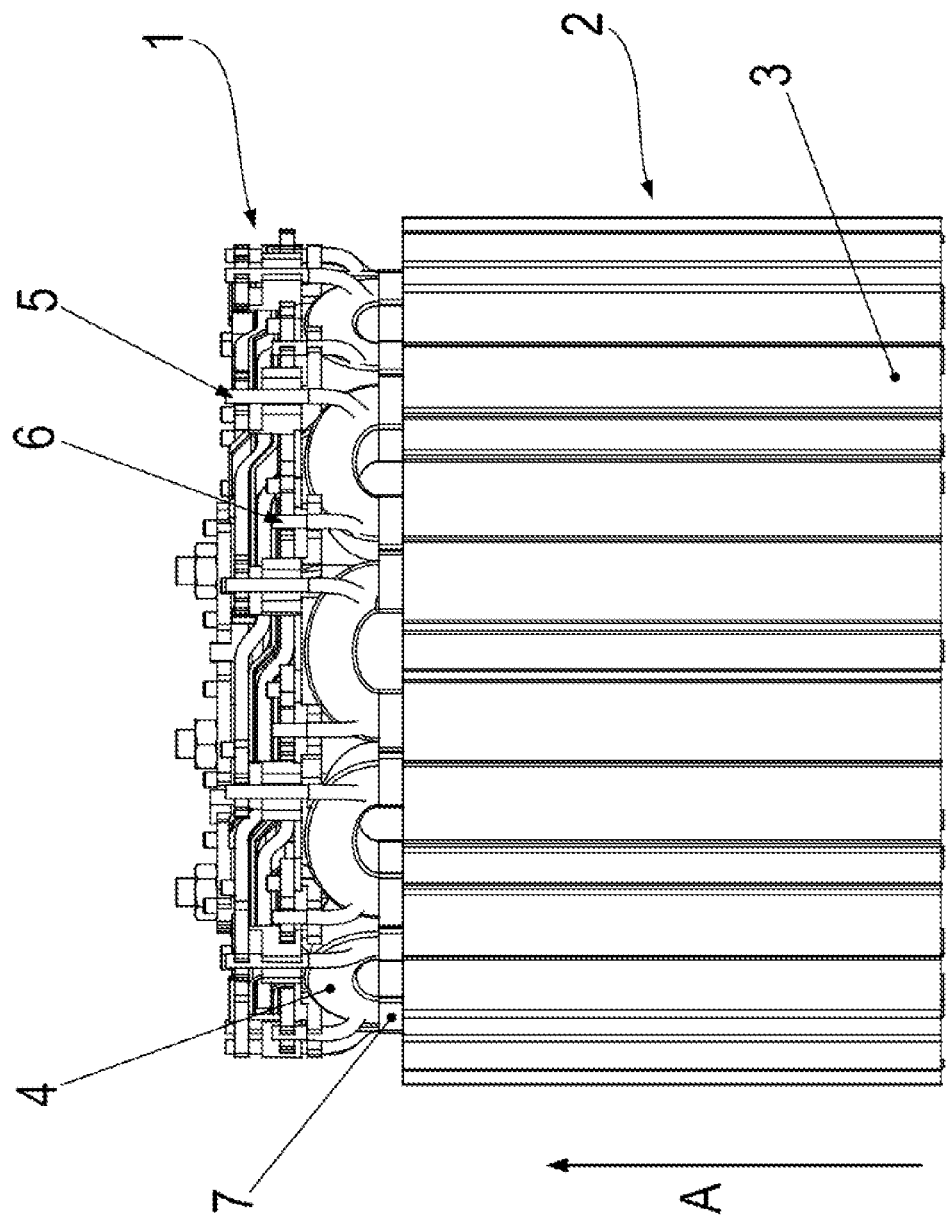
FIG. 2A is a side view of the stator and the first example embodiment of the wiring unit.
Figure 2B:
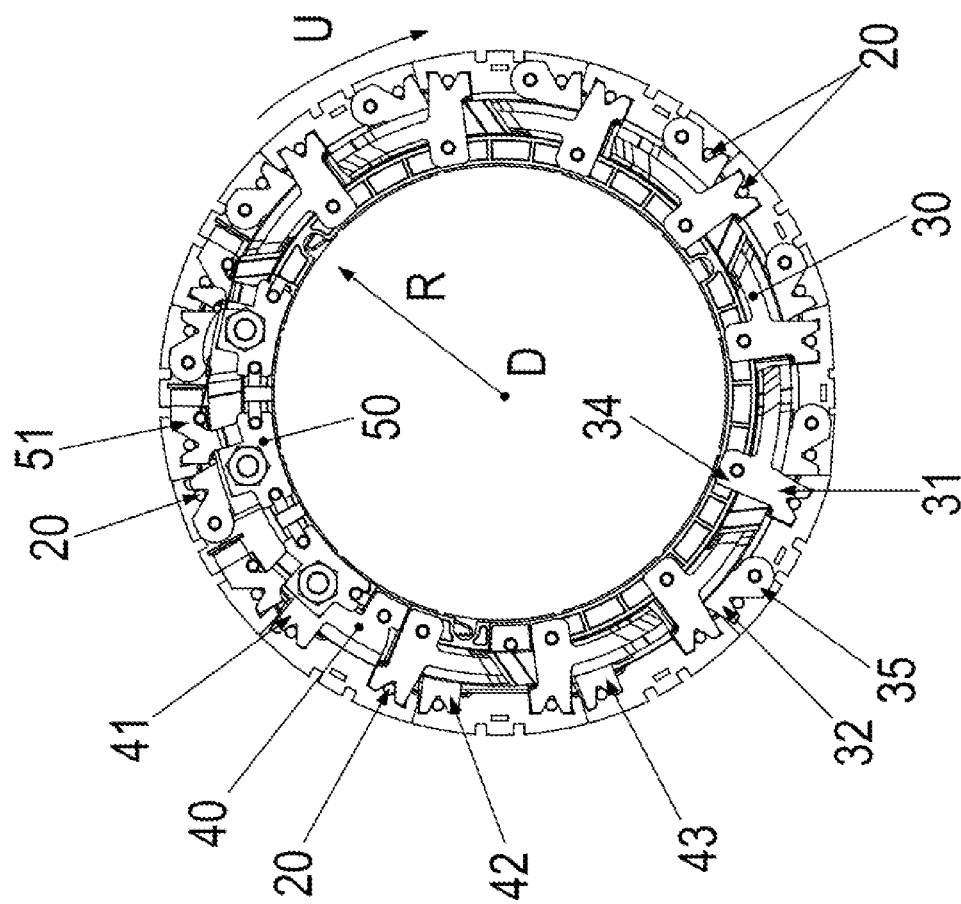
FIG. 2B is a top view of the stator and the first example embodiment of the wiring unit.

FIG. 2A shows the system from FIG. 1 in a side view. Direction A, which extends in parallel with axis of rotation D, is denoted as the axial direction. FIG. 2B shows the system from FIG. 1 in a top view. As illustrated, radial direction R is defined based on axis of rotation D. Radial direction R thus has an orthogonal extension with respect to axial direction A. Circumferential direction U extends along the circumference of stator 2 and is also shown in FIG. 2B.

Individual coils 4 are interconnected with the aid of wiring unit 1 in order to form a multiphase winding. In this particular exemplary embodiment, the twelve coils 4 are interconnected in the form of a star connection, a three-phase winding being formed in the process. As a result, four individual coils 4 are allocated to each phase. Within a phase, the four coils 4 are connected in series with the aid of wiring unit 1. All three phases in turn are connected to one another in the star point. The individual elements of wiring unit 1 are described in the following figures for better clarity.

Wiring unit 1 includes a plurality of wiring elements 30, 40, for the connection of the coil connections, as well as a carrier part 60 for the accommodation of wiring elements 30, 40, 50. To connect the twelve coils 4 shown in this exemplary embodiment into a three-phase winding in a star connection requires nine first wiring elements 30 and a second wiring element 40. If n denotes the number of phases and z the number of stator segments 3 and accordingly, the number of coils 4, then (z-n) first wiring elements 30 and a second wiring element 40 are required for a star connection. Second wiring element 40 thus is necessary only for the wiring in a star connection. It may be omitted for other connection types such as a delta connection.

FIG. 3A shows a first wiring element 30 in a perspective view. First wiring element 30 is made from sheet metal, e.g., steel sheet or copper sheet, and is, for example, produced as a punched and bent part. In this exemplary embodiment, first wiring element 30 includes a first contacting region 31 and a second contacting region 32. The two contacting regions 31, 32 are spaced apart from each other. A connection region 33 is situated between the two contacting regions 31, 32. Connection region 33 connects the two contacting regions 31, 32. Contacting regions 31, 32 are used for the electrical and mechanical connection of first wiring element 30 to coil connections 5, 6. One contacting region 31, 32 in each case is connected to a coil connection 5, 6. Contacting regions 31, 32 have a V-shaped notch 301 for accommodating a coil connection 5, 6 in the form of a winding wire.

In addition to contacting regions 31, 32, first wiring element has a first fastening region 34 and a second fastening region 35. Fastening regions 34, 35 are used for fastening first wiring element 30 on carrier part 60. In this exemplary embodiment, fastening regions 34, 35 have an uninterrupted recess 36, 37 in the form of a cylindrical hole. As an alternative, semi-open recesses such as in the form of an axially extending groove are also implementable.

FIG. 3B shows first wiring element 30 from FIG. 3A in a side view. In this exemplary embodiment, the first wiring element has a first step 37 and a second step 38. These steps 37, 38 are, for example, produced by bending. Due to these steps 37, 38, first and second fastening regions 34, 35 have different axial positions.

FIG. 3C shows a perpendicular projection of first wiring element 30 from FIG. 3A onto a plane orthogonal to the axis of rotation. Steps 38, 39 from FIG. 3B are therefore not visible. Hatched region B1 shows the region covered by connection region 33 in the circumferential and radial direction.

Figure 4:
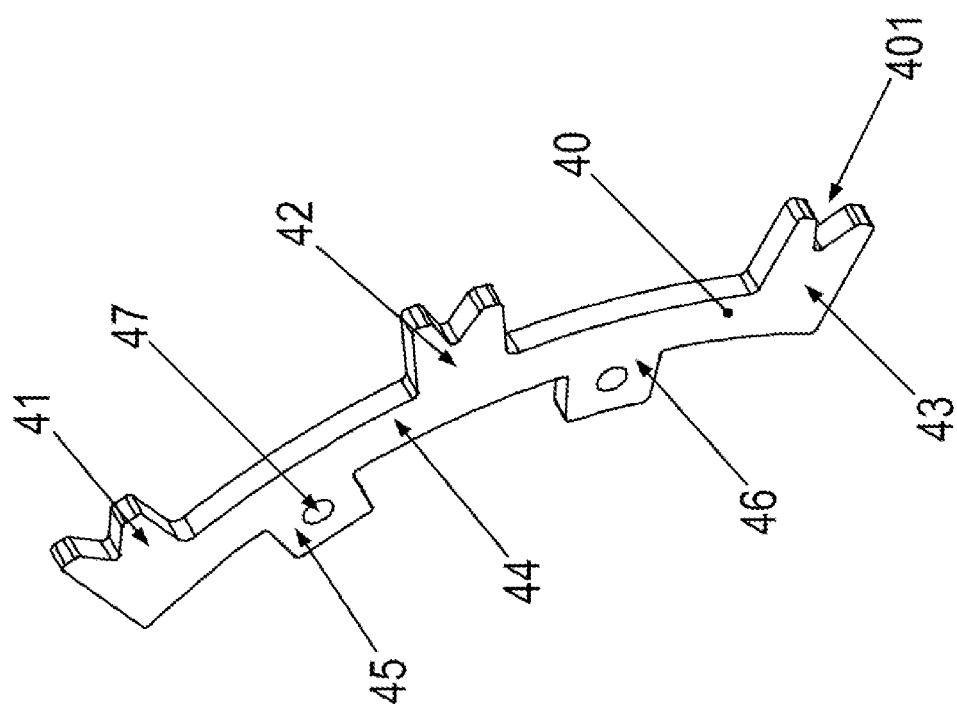
FIG. 4 is a perspective view of a second wiring element of the first example embodiment of the wiring unit.

FIG. 4 shows a second wiring element 40 in a perspective view. Second wiring element 40 is made from sheet metal, e.g., steel sheet or copper sheet, and it is, for example, produced as a punched and bent part. In this exemplary embodiment, second wiring element 40 has a first contacting region 41, a second contacting region 42, and a third contacting region 43. The three contacting regions 41, 42, 43 are set apart from one another. A connection region 44 is situated between first contacting region 41 and third contacting region 43. Second contacting region 42 is also situated in connection region 44. Connection region 44 thus interconnects the three contacting regions 41, 42, 43. Contacting regions 41, 42, 43 are used for the electrical and mechanical connection of second wiring element 40 to coil connections 5, 6. A contacting region 41, 42, 43 is connected to a coil connection 5, 6 in each case. Contacting regions 41, 42, 43 have a V-shaped notch 401 for the accommodation of a coil connection in the form of a winding wire. In a connection of three phases in a star connection, second wiring element 40 forms the star point at which the three phases are connected to each other.

In addition to contacting regions 41, 42, 43, second wiring element 40 has a first fastening region 45 and a second fastening region 46. Fastening regions 45, 46 are used for fastening second wiring element 40 to carrier part 60. In this exemplary embodiment, fastening regions 45, 46 have an uninterrupted recess 47 in the form of a cylindrical hole in each case. As an alternative semi-open recesses in the form of an axially extending groove, for instance, are also implementable.

FIG. 5A shows a third wiring element 50 in a perspective view. Third wiring element 50 is produced from sheet metal, e.g., steel sheet or copper sheet, and is, for example, produced as a punched and bent part. In this exemplary embodiment, third wiring element 50 has a first contacting region 51 and a second contacting region 52. The two contacting regions 51, 52 are spaced apart from each other. First contacting region 51 is used for the electrical and mechanical connection of third wiring element 50 to a coil connection 5, 6 and has a V-shaped notch 501 for this purpose. Second contacting region 52 is used for the electrical and mechanical connection of third wiring element 50 to a phase conductor. Third wiring elements 50 thus form the connections of the electric motor to phases U, V, W. Three third wiring elements 50 are thus required in a three-phase winding. The connection between third wiring elements 50 and the phase conductors may be implemented directly or indirectly, via a screw 80 having an associated nut 81. In principle, it is also possible to establish a direct connection between the phase conductors and coil connections 5, 6, so that third wiring elements 50 may be dispensed with. However, third wiring elements 50 simplify the production process of the electric motor and allow for a simpler connection of the phase conductors to the electric motor. In this exemplary embodiment, second contacting region 52 has an uninterrupted recess. A screw 80, which is used as a connection for a cable lug of the phase conductor, is guided through this recess. A nut 81 is used for fastening the cable lug to the third wiring element.

In addition to contacting regions 51, 52, third wiring element 50 has a first fastening region 53, a second fastening region 54, and a third fastening region 55. Fastening regions 53, 54, 55 are used for fastening third wiring element 50 on carrier part 60. In this exemplary embodiment, fastening regions 53, 54, 55 have semi-open recesses 56, 57 in the form of axially extending grooves. However, closed recesses such as in the form of cylindrical holes are also implementable as an alternative.

Figure 6:
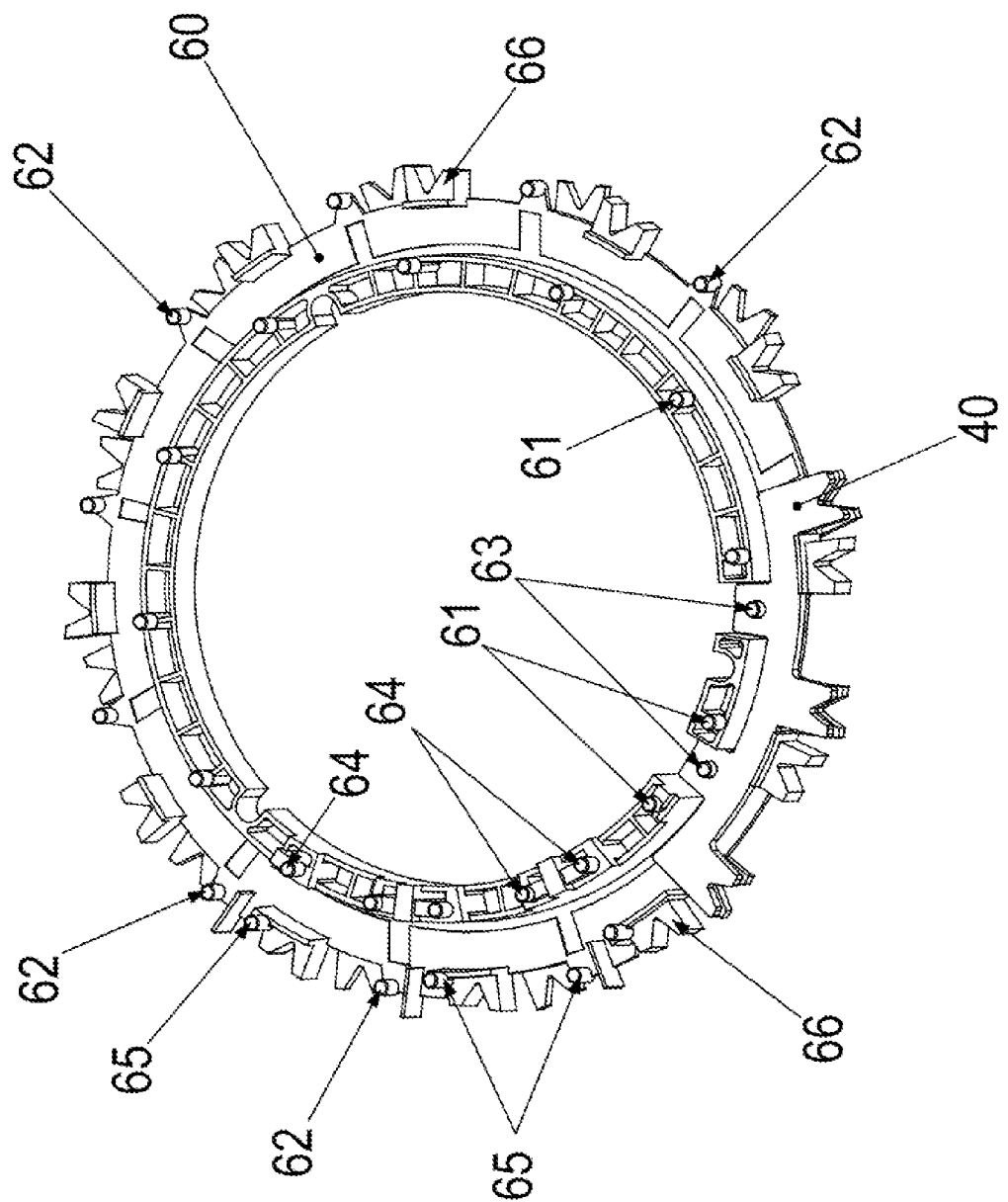
FIG. 6 is a perspective view of the carrier part of the first example embodiment of the wiring unit of FIG. 1 with the second wiring element of FIG. 4 situated thereon.

FIG. 6 shows carrier part 60 with a second wiring element 40 retained thereon. Carrier part 60 has a substantially annular configuration and is implemented as a plastic-extrusion-coated part in this exemplary embodiment. It is, for example, arranged as one piece. Carrier part 60 is situated concentrically with axis of rotation D at an axial end of stator 2, as illustrated in FIG. 1. Carrier part 60 has axial extensions 61, 62, 63, 64, 65 in the form of rivet pins. In this exemplary embodiment, extensions 61, 62, 63, 64, 65 have a cylindrical configuration, but other forms are also possible. Rivet pins 61, 62, 63, 64, 65 are, for example, arranged in complementary form to corresponding recesses 36, 37, 47, 56, 57 in order to allow for a stable mechanical connection between carrier part 60 and wiring element 30, 40, 50.

Carrier part 60 has first rivet pins 61 and second rivet pins 62 for retaining first wiring element 30. Carrier part 60 has, for example, third rivet pins 63 for retaining second wiring element 40. For example, carrier part 60 has fourth rivet pins 64 and fifth rivet pins 65 for retaining third wiring elements 50.

The first, third and fourth rivet pins are, for example, situated close to the inner circumference of carrier part 60, while the second and fifth rivet pins are situated close to the outer circumference of carrier part 60.

Carrier part 60 has multiple guide regions 66, which are distributed along its outer circumference. Each guide region 66 has a V-shaped notch and is used for guiding coil connections 5, 6 in the axial direction when the electrical connection is established between coil connections 5, 6 and contacting regions 31, 32, 41, 42, 43, 51. For this purpose, the position of a guide region 64 in the radial and circumferential direction is substantially similar to the position of a corresponding contacting region 31, 32, 41, 42, 43, 51. A guide region 66 is situated axially underneath a contacting region 31, 32, 41, 42, 43, 51. The V-shaped notch of guide region 66 is slightly offset in the radial direction, e.g., by 0.5 mm, with respect to the inner circumferential side, so that excellent contacting is ensured between coil connection 5, 6 and contacting region 31, 32, 41, 42, 43, 51.

During the production process, coil connections 5, 6 are first bent so that they point radially outward. Next, wiring unit 1 is placed on stator 2 and coil connections 5, 6 are then bent into position so that they point axially upward and contact the corresponding contacting regions 31, 32, 41, 42, 43, 51. Guide regions 66 facilitate the contacting process so that coil connections 5, 6 are aligned substantially in parallel with axial direction A.

The starting point in the method for producing wiring unit 1 is carrier part 60 made from insulating material. In this exemplary embodiment, it is produced from plastic with the aid of an injection molding process. Then, as illustrated in FIG. 6, second wiring element 40 is placed on carrier part Uninterrupted recesses 47 of fastening regions 45, 46 of second wiring element 40 are used as support so that third rivet pins 63 are able to be guided through recesses 47.

In a next production step, first wiring elements 30 are placed on carrier part 60, i.e., such that the region (B1, B2) covered by connection region 33 of one of first wiring elements 30 in the circumferential and radial direction overlaps with a region (B1, B2) covered by connection region 33 of another of first wiring elements 30 in the circumferential and radial direction. In other words, the first wiring elements are at least partially stacked axially on top of one another in the circumferential direction so that a more compact configuration is possible.

Uninterrupted recesses 36, 37 of fastening regions 34, 35 of first wiring elements 30 are used as support of first wiring elements 30 so that it is possible to guide first and second rivet pins 61, 62 through recesses 36, 37. Stable support is provided because one recess 36 of the two recesses 36, 37 of a first wiring element 30 is situated radially farther inward than other recess 37. Tilting of first wiring elements 30, in particular, is avoided. In other words, first fastening regions 34 have a radial position that differs from the radial position of second fastening regions 35.

First and second rivet pins 61, 62 and first wiring elements are placed and formed such that the positioned first wiring elements 30 do not touch one another. They are thus set apart from one another. As a matter of principle, no further electrical insulation is therefore required because the stator is usually encapsulated in a casting compound in a final production step, the casting compound serving as insulating material.

The electrical insulation between first wiring elements 30 may also be obtained using prefabricated insulation parts. For this purpose, for example, insulation parts 70 are made from plastic with the aid of injection molding methods. FIG. 7A shows an insulation part 70 which partially surrounds a first wiring element. In this exemplary embodiment, insulation part 70 is formed so that it is able to be slipped over first wiring element 30 in the radial direction. First wiring element 30 is partially surrounded by insulation part 70 in the circumferential direction such that mutual shifting of insulation part 70 and first wiring element 30 in this direction is not possible. A positive connection therefore exists on both sides in the circumferential direction. In addition, first wiring element 30 is partially surrounded by insulation part 70 in the axial direction such that a mutual displacement of insulation part 70 and first wiring element 30 is impossible in this direction. In other words, a positive connection on both sides is provided in the axial direction. In the radial direction, first wiring element 30 is positively connected to insulation part 70 only on one side, so that a mutual displacement is possible.

When insulation parts 70 are employed for the electrical insulation, it is advantageously possible that only every second one of first wiring elements 30 is surrounded by an insulation part 70 as described above. FIG. 7B shows first wiring element 30A with insulation part 70 from FIG. 7A slipped over it, and additionally a further first wiring element 30B, which is simply placed on insulation part 70. Another first wiring element 30 surrounded by an insulation part 70 then is placed on top of this further first wiring element 30B again.

FIG. 7C shows a perpendicular projection of the two first wiring elements 30A, 30B from FIG. 7 BA onto a plane orthogonal to the axis of rotation. Like in FIG. 3C, hatched region B1 shows the region covered by connection region 33 of a first wiring element 30 in the circumferential and radial direction. Analogous thereto, hatched region B2 shows the region covered by connection region 33 of the other first wiring element 30B in the circumferential and radial direction. These two regions partially overlap. In this particular exemplary embodiment, the regions covered by the two connection regions 33 in the radial direction are identical. However, they may also differ.

Figure 8:
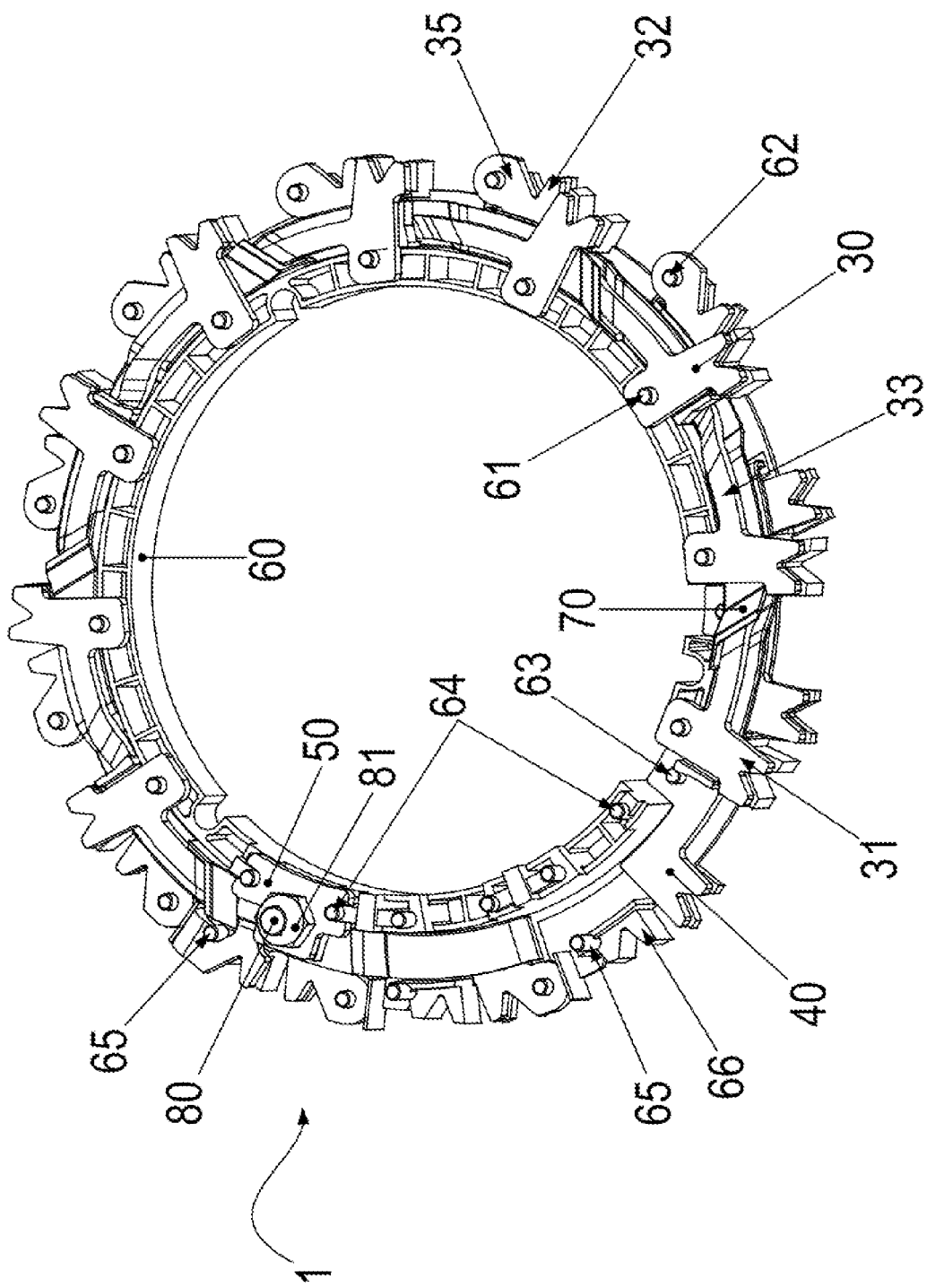
FIG. 8 is a perspective view of the carrier part of the first example embodiment of the wiring unit of FIG. 1 with wiring elements situated thereon.

FIG. 8 shows carrier part 60 and second wiring element 40 from FIG. 6 with the nine first wiring elements 30 situated thereon as well as the interposed insulation parts 70. Since only every second wiring element 30 is surrounded by an insulation part 70, only five insulation parts 70 are required in this exemplary embodiment. In addition, a third wiring element 50 is shown in FIG. 8, which is held in place by two fourth rivet pins 64 and a fifth rivet pin 65 of carrier part A square-head bolt 80 with an associated nut 81 is used for the contacting of third wiring element 50 to the phase conductor. The head of the screw is situated axially underneath the uninterrupted recess of second fastening region 52 so that hexagon nut 81 is accessible from above. This allows for simple contacting of the phase conductor to third wiring element 50 such as with the aid of cable lugs. In addition to the illustrated third wiring element 50, two further third wiring elements 50 are also used in this exemplary embodiment, which are placed counterclockwise in the circumferential direction next to illustrated third wiring element 50. In FIG. 1, all three third wiring elements 50 are shown.

After all wiring elements 30, 40, 50 are placed on carrier part 60, they are connected to carrier part 60. In this example, the free ends of rivet pins 61, 62, 63, 64, 65 are reshaped into rivet heads for this purpose, such that the diameter of the rivet heads in the plane orthogonal to the axis of rotation is greater than the diameter of the corresponding recesses. The reshaping may be implemented with the aid of ultrasonic welding, heat staking or hot stamping, for example. If only the rivet pin is reshaped during the reshaping process, without an integral connection being created between the carrier part and the wiring elements in the process, then a positive connection is produced. However, it is also possible that an integral connection is produced between the carrier part and the wiring elements as an alternative or in addition.

After wiring elements 30, 40, 50 have been connected to carrier part 60, coil connections 5, 6 are connected to corresponding contacting regions 31, 32, 41, 42, 51 of wiring elements 30, 40, 50 in order to establish an electrical connection. For this purpose, the stripped wire ends of the coils are inserted into V-shaped notches 301, 401, 501 of contacting regions 31, 32, 41, 42, 51, and an integral connection is created between the wire and wiring element. This is achieved by laser welding in this exemplary embodiment. However, it is also possible to use other methods.

After coils 4 of the electric motor have been wired in this manner so as to form of multiphase winding with the aid of wiring unit 1, stator 2 together with wiring unit 1 disposed at an axial end of the stator is encapsulated in casting compound for the mechanical affixation. If no insulation parts are used, this casting compound serves as the electrical insulation between wiring elements 30, 40, 50.

If, as illustrated in the present exemplary embodiment, three third wiring elements 50 are used, then attention must be paid during the encapsulation that second fastening regions 54 of third wiring elements 50 remain free of casting compound. In order to ensure that third wiring elements 50 are sufficiently surrounded by the casting compound and a stable affixation is achieved, third wiring elements 50 include, for example, anchoring regions 58, which axially point from the third fastening region in the direction of stator 2. Anchoring region 58 has, for example, an undercut 59 to improve the anchoring in the encapsulation compound.

FIG. 9B shows a first wiring element 90 as an alternative to a second exemplary embodiment of a wiring unit 1. This first wiring element 90 also has a first contacting region 91 and a second contacting region 92. Contacting regions 91, 92 each include a hook 93 by which a respective coil connection 5, 6 can be trapped and held in place in a friction-locked manner, in particular clamped between the hooks. In addition, coil connections 5, 6 are integrally connected to the hooks, e.g., using contact welding. Hooks 93 are open in a V-shape, the hooks forming the legs of the V.

With the aid of hooks 93, a rapid and quite simple electrical connection of coil connections 5, 6 to contacting regions 91, 92 is possible in that during the relative twisting of wiring unit 1 in relation to stator 2, coil connections 5, 6 are trapped in the interior region defined by contacting region 91, 92, i.e., in particular in the interior region defined by the V of V-shaped hook 93. Respective contacting region 91, 92 thus threads in respective coil connection 5, 6 up to the connection position at the inner tip of the V. As soon as the twisting has concluded, a connection is implemented by contact welding. To this end, the respective legs of contacting region 91, 92, i.e., hooks 93, are first pressed on top of one another by bending them accordingly until coil connection 5, 6 is held in place by friction locking, in particular is clamped, by hooks 93 of contacting region 91, 92. Next, contact welding is carried out so that the electrical connection between coil connection 5, 6 and contacting region 91, 92 is able to be established without brazing solder.

However, as also in the first exemplary embodiment, connection region 94 of first wiring element 90 of the second exemplary embodiment has two axial steps 95, 96. In contrast to the first exemplary embodiment, however, this first wiring element 90 has only one fastening region 97. The fastening region includes an uninterrupted recess 98.

FIG. 9A shows an insulation part 99, which is slipped over first wiring element 90. FIG. 9C shows first wiring element with slipped-on insulation part 99.

FIG. 9D shows first wiring element 90A with slipped-on insulation part 99 from FIG. 9C and additionally, a further first wiring element 90B, which is situated on insulation part 99. There is an overlap between the regions covered by the two connection regions 94 of the two first wiring elements 90A, 90B in the circumferential and radial direction.

Figure 10:
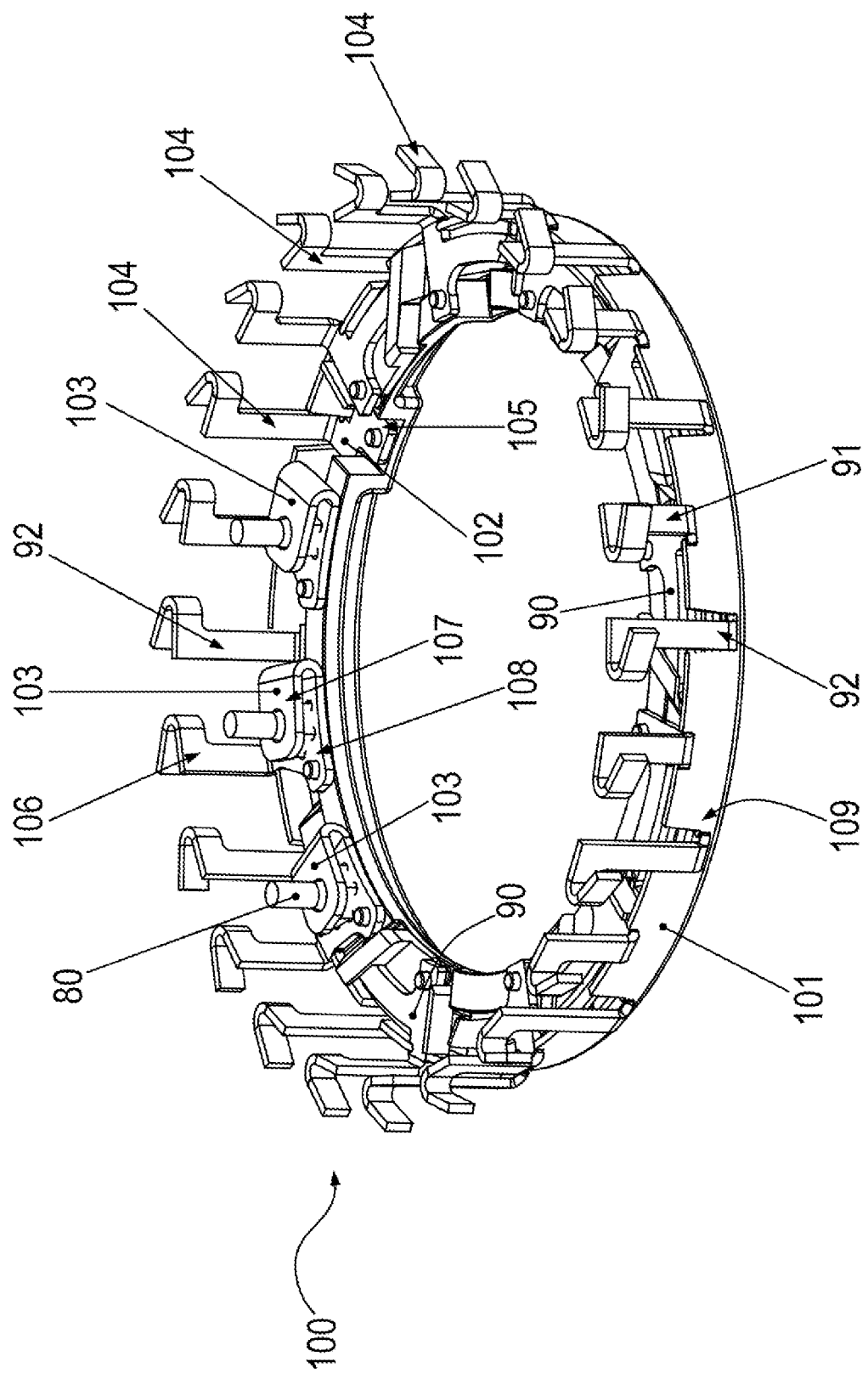
FIG. 10 is a perspective view of a wiring unit of the second example embodiment.

FIG. 10 shows wiring unit 100 of the second exemplary embodiment. As in the first exemplary embodiment, wiring unit 100 has a carrier part 101 for holding the nine first wiring elements 90, second wiring element 102 and the three third wiring elements 103.

Similar to the first exemplary embodiment, second wiring element 102 has three contacting regions 104. Like in the first exemplary embodiment, second wiring element 102 has two fastening regions 105 of which only one can be seen because of the perspective representation.

As in the first exemplary embodiment, third wiring element 103 has a first contacting region 106 for the contacting with a coil connection 5, 6, and a second contacting region 107 for the contacting with a phase conductor. In contrast to the first exemplary embodiment, third wiring element 103 has only one fastening region 108.

In the second exemplary embodiment as well, the positive connection between wiring elements 90, 102, 103 and carrier part 101 is achieved by reshaping rivet pins of the carrier part into rivet heads, the rivet pins being able to be guided through recesses in the respective fastening regions.

The positioning of wiring elements 90, 102, 103 on carrier part 101 in the second exemplary embodiment is achieved in that carrier part 101 has a circumferential annular groove for the accommodation of wiring elements 90, 102, 103. In addition, carrier part 101 has on its outer circumference recesses 109 in the groove wall, through which contacting regions 91, 92, 104, 106 are able to be passed. This, too, contributes to a positioning of the components with an accurate fit.

In both exemplary embodiments, all first wiring elements 30, have the same configuration and thus are non-variable parts. In the same manner, third wiring elements 50, 103 have the same configuration, and thus are non-variable parts. This offers the advantage that the parts are able to be produced more economically. However, it is also possible that first wiring elements 30, 90 and/or third wiring elements 50, 103 are configured differently.

In both exemplary embodiments, both the regions covered by connection regions 33, 94 of first wiring elements 30, 90 in the axial direction and the regions covered by connection regions 33, 94 of first wiring elements 30, 90 in the radial direction are identical. However, it is also possible that these regions differ.

LIST OF REFERENCE NUMERALS 1 wiring unit
2 stator
3 stator segment
4 coil
5 first coil connection
6 second coil connection
7 insulation paper
30 first wiring element
31 first contacting region of a first wiring element
32 second contacting region of a first wiring element
33 connection region of a first wiring element
34 first fastening region of a first wiring element
35 second fastening region of a first wiring element
36 first uninterrupted recess in a first wiring element
37 second uninterrupted recess in a first wiring element
38 first step of a first wiring element
39 second step of a first wiring element
301 V-shaped notch
40 second wiring element
41 first contacting region of the second wiring element
42 second contacting region of the second wiring element
43 third contacting region of the second wiring element
44 connection region of the second wiring element
45 first fastening region of the second wiring element
46 second fastening region of the second wiring element
47 uninterrupted recess in the second wiring element
401 V-shaped notch
50 third wiring element 51 first contacting region of a third wiring element
52 second contacting region of a third wiring element
53 first fastening region of a third wiring element
54 second fastening region of a third wiring element
55 third fastening region of a third wiring element
56 uninterrupted recess in a third wiring element
57 uninterrupted recess in a third wiring element
58 anchoring region of a third wiring element
60 carrier part
61 first rivet pin
62 second rivet pin
63 third rivet pin
64 fourth rivet pin
65 fifth rivet pin
66 guide region
70 insulation part
80 screw
81 nut
90 first wiring element
91 first contacting region of a first wiring element
92 second contacting region of a first wiring element
93 hook
94 connection region of a first wiring element
95 axial step
96 axial step
97 fastening region of a first wiring element
98 uninterrupted recess in a first wiring element
99 insulation part
100 wiring unit
101 carrier part
102 second wiring element
103 third wiring element
104 contacting region of a second wiring element
105 fastening region of a second wiring element
106 first contacting region of a third wiring element
107 second contacting region of a third wiring element
108 fastening region of a third wiring element

The invention claimed is:

1. An electric motor, comprising:
a rotor situated rotatable about an axis of rotation; and
a stator having multiple coils, each coil having two coil connections, the stator having multiple stator segments, each stator segment having exactly one coil, the coils being connected to one another by a wiring unit, the wiring unit including a carrier part adapted to accommodate multiple wiring elements set apart from one another, the wiring elements including at least three first wiring elements, each first wiring element including two and/or exactly two contacting regions set apart from one another and a connection region connected to the contacting regions so that the connection region is arranged between the contacting regions, the contacting regions of each first wiring element being connected to, electrically connected to, and/or integrally connected by laser welding to one of the coil connections at a connection point, a region covered by the connection region of one of the first wiring elements in circumferential and radial directions overlapping with a region covered by the connection region of another of the first wiring elements in the circumferential and radial directions;
wherein each first wiring element includes a first fastening region adapted for positive and/or integral connection to the carrier part, each first fastening region having a first uninterrupted recess in an axial direction, the carrier part having multiple rivet pins extending in the axial direction, a first rivet pin being guidable through each of the first recesses, free ends of the first rivet pins adapted to be reshaped into rivet heads by ultrasonic welding.

2. The electric motor according to claim 1, wherein the electric motor is arranged as a permanently excited synchronous motor.

3. The electric motor according to claim 1, wherein the coils are connected to one another in a star connection.

4. The electric motor according to claim 1, wherein the carrier part is arranged as a substantially annular carrier part and/or is formed of an insulating material.

5. The electric motor according to claim 1, wherein the carrier part is adapted to accommodate at least four wiring elements.

6. The electric motor according to claim 1, wherein the wiring unit is arranged at an axial end of the stator and/or is arranged concentrically with the axis of rotation.

7. The electric motor according to claim 1, wherein each first wiring element includes a second fastening region adapted for positive and/or integral connection to the carrier part, each second fastening region having a second uninterrupted recess in the axial direction, a second rivet pin guidable through each of the second recesses, free ends of the second rivet pins adapted to be reshaped into rivet heads by ultrasonic welding.

8. The electric motor according to claim 7, wherein the first fastening regions of each of the first wiring elements have a same first radial position and/or a same first axial position, and/or the second fastening regions of each of the first wiring elements have a same second radial position and/or a same second axial position, the first radial position and the second radial position differing, the first axial position and the second axial position differing.

9. The electric motor according to claim 1, wherein the carrier part has a plurality of guide regions on an outer circumference adapted to guide the coil connections in the axial direction, a guide region being allocated to each contacting region connected to a coil connection, a form of the guide region being substantially similar to a form of a respectively allocated contacting region.

10. The electric motor according to claim 1, wherein a second wiring element is provided, having three and/or exactly three contacting regions, each contacting region of the second wiring element being connected to, electrically connected to, and/or integrally connected by laser welding to one of the coil connections, the second wiring element having two and/or exactly two fastening regions adapted for positive and/or integral connection to the carrier part, each fastening having an uninterrupted recess in the axial direction, a third rivet pin guidable through each of the recesses, free ends of the third rivet pins adapted to be reshaped into rivet heads by ultrasonic welding.

11. The electric motor according to claim 1, wherein a plurality and/or exactly three third wiring elements are provided, each third wiring element having a first contacting region and a second contacting region having different configurations, the first contacting region of each third wiring element being connected to, electrically connected to, and/or integrally connected by laser welding to one of the coil connections, each third wiring element having first and second fastening regions adapted for positive and/or integral connection to the carrier part, each fastening region having an uninterrupted recess in the axial direction, and a fourth rivet pin is guidable through each of the recesses, free ends of the fourth rivet pins adapted to be reshaped into rivet heads by ultrasonic welding, each third wiring element having a third fastening region adapted for positive and/or integral connection to the carrier part, the third fastening region abutting the first contacting region of a respective third wiring element, the third fastening region having an uninterrupted recess in the axial direction through which a fifth rivet pin is guidable, free ends of the fifth rivet pins adapted to be reshaped into rivet heads by ultrasonic welding.

12. The electric motor according to claim 11, wherein a region covered by the second wiring element in the circumferential and radial directions and a region covered by at least one and/or two of the first wiring elements in the circumferential and the radial directions overlap.

13. The electric motor according to claim 1, wherein the contacting regions of each first wiring element are formed such that the respective connection points have substantially a same radial position at an outer circumference of the carrier part, and/or regions covered by the connection regions of the first wiring elements in the axial direction are identical and/or regions covered by the connection regions of the first wiring elements in the radial direction are identical.

14. The electric motor according to claim 1, wherein the connection region of each of the first wiring elements has a cross-section and/or an approximately rectangular cross-section having an extension in the axial direction smaller than an extension in the radial direction, and/or at least one and/or all connection regions of one of the first wiring elements have two axial steps.

15. The electric motor according to claim 1, wherein a region covered by one of the first wiring elements in the circumferential and radial directions overlaps with two regions covered by two other first wiring elements in the circumferential and radial directions, and/or a region covered by a second wiring element in the radial direction and the region covered by at least one and/or all of the first wiring elements in the radial direction are identical.

16. The electric motor according to claim 1, wherein the first wiring elements have an identical configuration and/or third wiring elements have an identical configuration.

17. The electric motor according to claim 1, wherein at least one of the first wiring elements is surrounded by an insulation part made of an injection molded insulating material such that the surrounded first wiring element and the surrounding insulation part are positively connected on both sides in the circumferential direction and/or are connected in a positive manner on both sides in the axial direction, and/or are positively connected on one side in the radial direction, only every second of the first wiring elements being surrounded by a respective insulation part in the circumferential direction.

18. The electric motor according to claim 1, wherein the coil connections are integrally connected by laser welding to the contacting regions of the first wiring elements, and/or to contacting regions of second wiring elements, and/or to a contacting region of third wiring elements, the contacting regions to be connected having a V-shaped notch adapted to accommodate a coil connection, and a radius of arc section being at most as large as a radius of a winding wire.

19. A method for producing an electric motor as recited in claim 1, comprising:
providing a substantially annular carrier part made of an injection molded insulating material;
placing multiple first wiring elements on the carrier part in a circumferential direction, the first wiring elements having two and/or exactly two contacting regions, the first wiring elements being placed such that a region covered by one of the first wiring elements in the circumferential and a radial direction overlaps a region covered by an adjacent first wiring element in the circumferential and radial directions, the first wiring elements being arranged at a distance from one another;
connecting the first wiring elements to the carrier part in a positive and/or integral manner to form a wiring unit; and
connecting, electrically connecting, and/or integrally connecting by laser welding each of the contacting regions of the first wiring elements to a coil connection of one of a plurality of coils having two coil connections arranged on a stator of the electric motor to connect the coils into a multiphase winding.

20. The method according to claim 19, wherein each of the first wiring elements has a first fastening region adapted for positive and/or integral connection to the carrier part, each of the first fastening regions having a first uninterrupted recess in an axial direction, the carrier part having multiple rivet pins extending in the axial direction, a first rivet pin being guided through each of the first recesses, free ends of the first rivet pins being reshaped into rivet heads by ultrasonic welding.

21. The method according to claim 19, wherein the first wiring elements are placed such that only every second of the first wiring elements is surrounded in a circumferential direction by an insulation part made from an injection molded insulating material, surrounded first wiring element and the surrounding insulation part being positively connected on both sides in the circumferential direction and/or being positively connected on both sides in the axial direction, and/or being positively connected on one side in the radial direction.

22. The method according to claim 19, wherein a second wiring element is placed on the carrier part, the second wiring element having three and/or exactly three contacting regions, the second wiring element is connected to the carrier part in a positive and/or an integral fashion to form the wiring unit, and each contacting region of the second wiring element is connected to, electrically connected to, and/or integrally connected by laser welding to one of the coil connections.

23. The method according to claim 19, wherein three and/or exactly three third wiring elements are placed on the carrier part, the third wiring elements having two contacting regions of a different type, the third wiring elements are connected to the carrier part in a positive and/or integral fashion to form the wiring unit, and one of the two contacting regions of the third wiring elements is connected to, electrically connected to, and/or integrally connected by laser welding to one of the coil connections.

24. The method according to claim 19, wherein the stator with the coils and the wiring unit connected to the coil connections are encapsulated in a casting compound such that the contacting regions of third wiring elements that are not connected to a coil connection remain free of the casting compound.

* * * * *